Patented Oct. 9, 1951

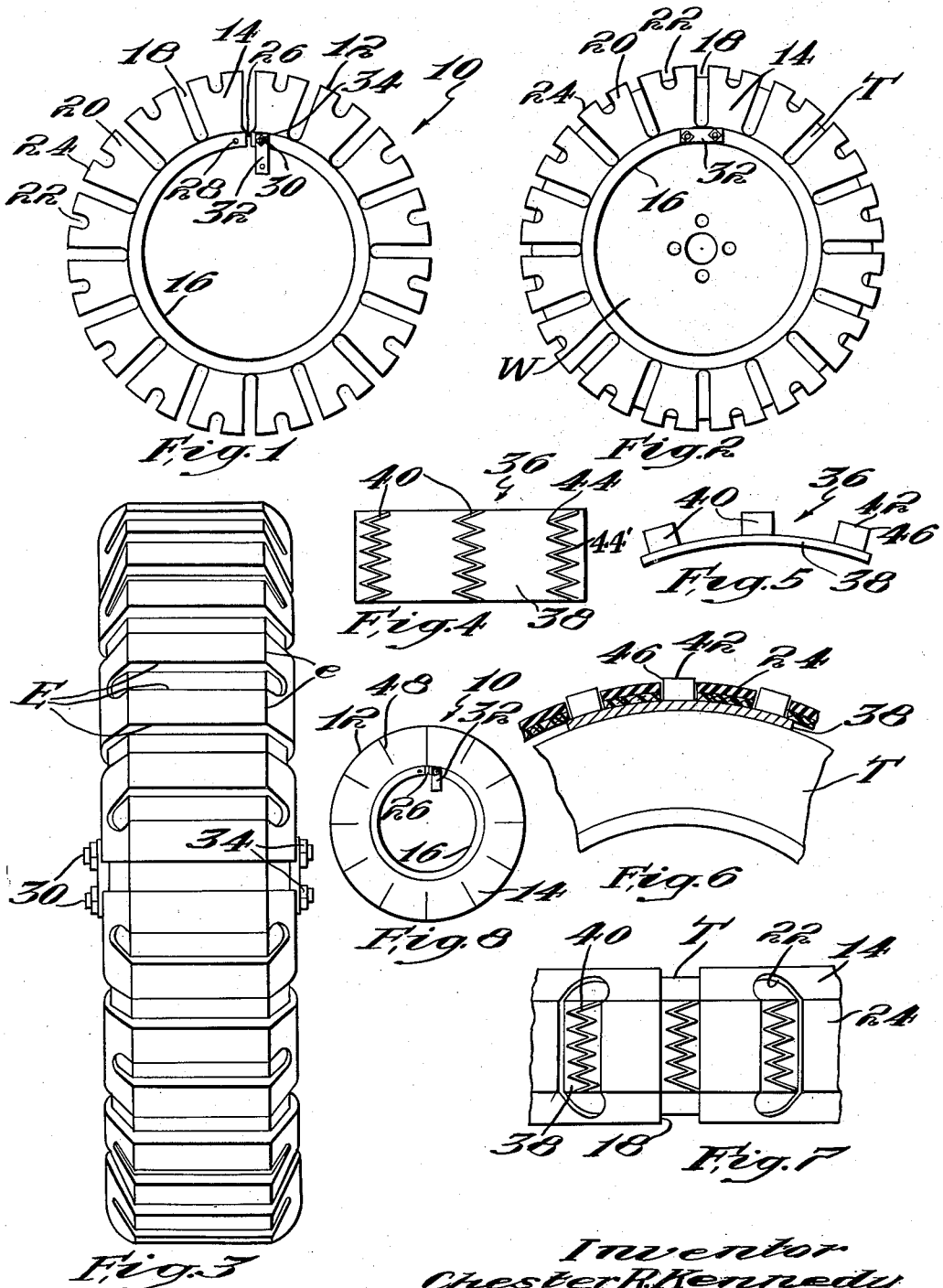

2,570,689

UNITED STATES PATENT OFFICE 2,570,689

ANTISKID DEVICE FOR PNEUMATIC TIRES

Chester R. Kennedy, Lakeville, Mass.

Application May 8, 1948, Serial No. 25,923

3 Claims. (Cl. 152—222)

This invention relates to anti-skid devices for pneumatic tires and more especially to improvements in the anti-skid device illustrated and described in my pending application, Serial No. 8,617 filed February 16, 1948.

As shown therein the anti-skid device comprised a worn-out or partially worn tire carcass or case which has a plurality of spaced slots cut transversely of its tread surface, these slots terminating at opposite sides of the tread in the side walls short of the reinforcing beads which border the inner edges of the walls of the case. The beads are split at one point to permit the case to be extended and placed about the tire to which it is to be applied while the latter is partially inflated, and fastening means is provided for securing the split beads together after the case is assembled on the tire whereupon the tire is reinflated. The transverse slots formed in the tread of the case provide a series of spaced blocks having sharp, transversely extending edges which dig into a soft terrain and afford additional traction for forward movement or traction to prevent forward skidding upon smooth surfaces. The longitudinal edges of these blocks afford some resistance to lateral sliding and skidding but not as much as is desired.

Objects of this invention are to improve upon the aforesaid anti-skid device by providing an anti-skid device which will prevent both forward and lateral skidding, which may be used with the aforesaid anti-skid device to improve its resistance to lateral skidding, which may be used independently of the aforesaid device if desired, and which will be simple to make, easy to install, durable and effective in use.

As herein illustrated, the anti-skid device comprises a metal plate approximately as wide as the tread of the tire to which it is to be applied, the plate being bent to have a longitudinal curvature substantially equal to that of the inflated tire and on the convex surface of the plate there is attached to it means in the form of a tooth having flat, ground-engaging surfaces, the edges of which are defined by sharp, right-angle corners. The plates may be used in conjunction with the aforesaid slotted tire carcass and when thus used each plate is interposed between the tire tread and the slotted carcass with its tooth projecting through the space between a pair of adjacent blocks. The length of each tooth is such that it extends appreciably beyond the tread surfaces of the blocks. Preferably each plate has two or more sets of teeth longitudinally spaced apart and each tooth is in the form of a zigzag flange extending transversely across the plate so that the edges of alternate sections of a given tooth diverge slightly to one side of the longitudinal center line of the plate while the edges of the intermediate sections diverge to the other side. The angular arrangement of the tooth sections provides sharp edges which are substantially parallel to the longitudinal center line of the plate in contrast to the edges of the block which are at right angles to the center line of the plate and hence resist lateral skidding. The pressure of the inflated tire and the engagement of the teeth within the transverse slots will hold the plate immovably in place.

The invention will now be described in more detail with reference to the accompanying drawings in which:

Fig. 1 is a side elevation of the improved anti-skid device of my aforementioned pending application viewed from one side with the uniting link disconnected at one end;

Fig. 2 is a side elevation of the improved anti-skid device of Fig. 1 viewed from the inside showing it mounted on a pneumatic tire and with the uniting device connected;

Fig. 3 is a top view looking down on Figs. 1 and 2 to a larger scale showing the anti-skid device mounted on a pneumatic tire and the spaced tread blocks which form the ground-gripping surface thereof;

Fig. 4 is a plan view of an anti-skid element of this invention used with the anti-skid device of Figs. 1, 2 and 3 to greatly enhance its resistance to lateral skidding;

Fig. 5 is a side elevation of the anti-skid element shown in Fig. 4;

Fig. 6 is a fragmentary portion of a pneumatic tire with which there is associated the anti-skid device and element shown in vertical section;

Fig. 7 is a plan view looking down on top of Fig. 6; and

Fig. 8 is a view from one side of a modified form of anti-skid device to smaller scale showing the uniting link disconnected at one end.

Referring to the drawings, the anti-skid device 10 as illustrated in the aforesaid pending application is comprised of a worn-out or partially worn tire carcass or case having a tread 12, side walls 14, and inner bead-like reinforcements 16. Conventionally these bead-like portions 16 are reinforced with metal cables. A plurality of deep radial slots 18 are cut in the casing tranversely of its tread portion, these deep slots 18 being symmetrically arranged and being spaced at equal intervals around the periphery of the tire thus providing a series of spaced segments 20 each united at its inner ends to the beads 16 at each side of the tire. Preferably these slots 18 are of the order of one inch in circumferential width and, as shown herein, sixteen slots are formed although the number of slots may be varied to adapt the device to any particular use or conditions which may be encountered. Having prepared the deep slots 18, a second series of slots 22 is then formed. These slots 22 are located midway between the adjacent slots 18 of the first series of slots and extend through the tread portion terminating approximately at the junction between the tread surface and the side walls at opposite sides of the tire. The slots 22 are approximately one inch in circumferential width and are disposed midway between the adjacent slots 18 so that a series of substantially equally spaced tread blocks 24 are provided about the periphery of the case.

Having formed the slots 18 and 22, the case is then cut completely through its bead portions 16 at one point, as shown at 26 in Fig. 1 and at each side of this cut holes 28 are formed which extend through the thickness of the bead for the reception of bolts 30 (Figs. 1 and 2). The heads of these bolts (not shown) are arranged at the inside of the case preferably with washers beneath their heads and extend outwardly through the holes 28. A rigid link 32 having holes in its opposite ends is placed on the outwardly projecting shanks of each pair of these bolts 30 and nuts 34 are engaged with the outer ends of the bolts 30 to hold the links 32 in place.

As thus constructed the slotted and split case is distended and placed about a partially deflated tire T which is mounted on a wheel or rim W, as shown in Fig. 2. The rigid links 32 are engaged at both ends with the bolts 30 and locked in place by means of the nuts 34 and then the tire is inflated to its normal pressure thereby fixing the case in position and constituting an anti-skid means for the tire. As described in the aforesaid pending application, the transverse edges E of the tread blocks 24 afford traction which minimizes forward or rearward skidding. Resistance to lateral skidding is also afforded by the fairly sharp lines e of division between the opposite ends of the tread blocks 24 and the walls 14 although these lines of division are rendered somewhat indistinct and less effective by the worn condition of the casing and hence cannot be relied upon to provide an entirely satisfactory insurance against lateral skidding.

Accordingly, the present invention contemplates the use of anti-skid elements 36 (Fig. 4) in conjunction with the aforesaid anti-skid device 10 which will provide positive means for preventing lateral skidding. As illustrated, the anti-skid element 36 is in the form of a metal plate 38 which is of substantially the same width as the tread portion of the tire to which it is to be applied and has a longitudinal curvature which is substantially the same as the circumferential curvature of the inflated tire (Fig. 6). The length of this plate may be varied but is preferably not more than six to eight inches long and has fixed to its convex surface a plurality of spaced teeth 40. The heightwise length of each tooth 40 is somewhat greater than the thickness of the carcass through the tread portion so that the ground-engaging end surface 42 projects appreciably beyond the tread surfaces of the blocks 24 between which it will be situated as will appear hereinafter. Each tooth consists of a series of sections arranged in zigzag fashion so that alternate portions 44 thereof diverge slightly from one side of the longitudinal center line of the tooth 40 and intermediate portions 44' diverge from the opposite side of the center line. The surfaces 42 of the tooth sections are defined by sharp right-angle corners 46 so that sharp edges are provided to afford traction. Since these sharp edges are more nearly parallel to the longitudinal center line of the plate 38 than to its transverse center line, they offer considerable resistance to lateral skidding.

Three anti-skid elements 36 are usually employed with the aforesaid anti-skid casing 10 and are interposed between the casing and the tire T while the latter is partially deflated at equally spaced points about the tire with the tooth portions 40 extending through the adjacent slots 18 and 22 (Fig. 6). When the tire T is inflated, these plates will be locked against displacement between the casing and the tire T by frictional engagement with the opposite surfaces of the plate and by engagement of the teeth within the slots. While it is recommended that three plates be employed, it is to be understood that a greater or lesser number of plates may be used. It is also to be understood that while old or worn-out tire carcasses are specified, it is not intended that this shall be limiting since relatively new tires could be employed, for example, a too large tire which had no other immediate use or a structure may be made up of this character specifically for the purpose of being employed as an anti-skid device. It is, moreover, contemplated that the slotted tire casing may be dispensed with and that the plates may be employed independently as, for example, by punching holes in the opposite edges of each plate and attaching the plate to a pneumatic tire by passing chains, cables or straps about the wheel felly and securing its ends in the holes.

While the anti-skid device 10 and the anti-skid element 36 are primarily for affording anti-skid properties, the device 10 and the combination of the device 10 and elements 36 also constitute a protective armor for the pneumatic tire T and may be employed very effectively to preserve the tire against cuts, bruises and other damage when the vehicle upon which the tires are mounted is to be used in places where there are sharp stones or where there may be sharp pieces of metal scrap lying around over which the tires may pass in their ordinary use, thus extending the life of the tire materially. In this connection an alternative and primarily protective device may be employed such as shown in Fig. 8 which comprises a worn-out or partially worn case 10' having a plurality of equally spaced transversely formed incisions 48 formed through the tread surface 12' and the walls 14 and terminating short of the beads 16. This casing, like that shown in Fig. 1, is split at 26—26 so that it may be applied to the pneumatic tire T and is provided with rigid links 32 by which it may be locked in place after it has been applied to the pneumatic tire. The transversely formed incisions 48 allow some expansion of the casing so that it will accommodate itself to the pneumatic tire and will spread apart somewhat during use so as to afford some anti-skid properties. Primarily, however, the casing will serve to protect the tire against damage.

It should be understood that the present disclosure is for the purpose of illustration only and that this invention includes all modifica-

I claim:

1. In combination with a pneumatic tire, a split tire shoe, of substantially the same size as the pneumatic tire to which it is to be applied, mounted on the pneumatic tire, said shoe including side walls, a tread surface, and edge beads and having a series of peripherally spaced slots extending transversely of the tread portion of the shoe, between which are tread blocks, and a series of curved convex plates interposed between the inside of the shoe and the tread of the pneumatic tire, each plate being engaged by portions of the shoe at least at opposite sides of a single slot, and having a tooth fixed to the convex side thereof which extends through a slot between adjacent tread blocks to a point appreciably beyond their surfaces, said tooth having edges defined by right-angular corners which are situated at acute angles with respect to the longitudinal center line of the tread.

2. In combination with a pneumatic tire, a split tire shoe, of substantially the same size as the pneumatic tire to which it is to be applied, mounted on the pneumatic tire, said shoe including side walls, a tread surface and edge beads, a series of spaced slots in the tread portion of the shoe which extends transversely of the tire tread when the device is in use, between which are tread blocks, and a series of curved plates interposed between the carcass and the tread, each plate having a longitudinal curvature corresponding substantially to the circumferential curvature of the tire tread and extending beneath at least two slots and the intermediate tread block and having teeth fixed thereto, said teeth being spaced to extend through the slots to points appreciably beyond the surfaces of the blocks, each tooth having angularly arranged, ground-engaging surfaces, adjacent portions of which diverge in opposite directions from the center line of the tire tread.

3. In combination with a pneumatic tire, a split tire shoe, of substantially the same size as the pneumatic tire to which it is to be applied, mounted on said pneumatic tire, said shoe including side walls, a tread and reinforced edge beads, and having a series of spaced slots in that tread portion which extend transversely of the tread when the device is in use, between which are tread blocks, and a series of curved plates interposed between the shoe and the tire tread, each plate having a longitudinal curvature corresponding to the circumferential curvature of the tire tread and extending beneath at least two slots and the intermediate the tread block and having spaced parallel teeth fixed to its convex surface to extend through the slots to points appreciably beyond the surfaces of the blocks, each tooth extending transversely of the plate within its slot and having zigzag, ground-engaging surfaces with sharp edges defined by substantially right-angle corners.

CHESTER R. KENNEDY.

REFERENCES CITED

The following references are of record in the file of this patent:

UNITED STATES PATENTS

| Number | Name | Date |
| --- | --- | --- |
| 894,377 | Filler | July 28, 1908 |
| 1,481,232 | Schwiesow | Jan. 15, 1924 |
| 1,578,803 | Comey | Mar. 30, 1926 |
| 1,615,154 | Anderson | Jan. 18, 1927 |

FOREIGN PATENTS

| Number | Country | Date |
| --- | --- | --- |
| 184,107 | Great Britain | Aug. 10, 1922 |
| 367,772 | Italy | Feb. 2, 1939 |